W. W. Levering.
College-Cabinet.
No. 3446. Reissued May 18. 1869.
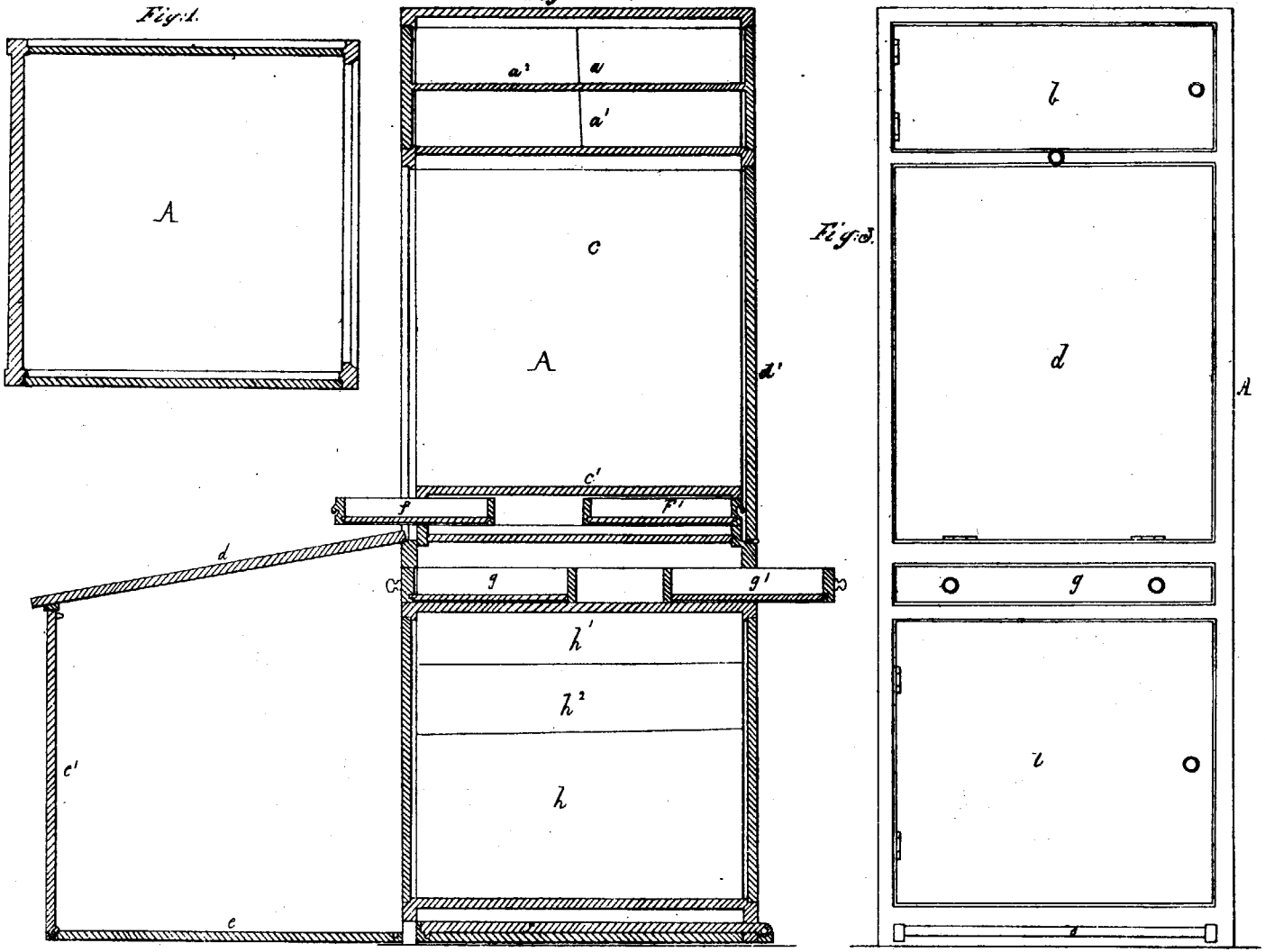
Witnesses
Thos. Ward
John. Marquis
William W. Levering.
By his Attys Dewey & Co.

United States Patent Office.

WILLIAM W. LEVERING, OF NEW YORK, N. Y.

*Letters Patent No.* 60,529, *dated December* 18, 1866; *reissue No.* 3,446, *dated May* 18, 1869.

IMPROVED COLLEGE-CABINET.

The Schedule referred to in these Letters Patent and making part of the same.

*To all whom it may concern:*

Be it known that I, WILLIAM W. LEVERING, of New York city, in the State of New York, have invented an Improved Desk or Table and College-Cabinet, combined; and I hereby declare the following to be a full and exact description thereof, reference being had to the accompanying drawings, forming part of this specification.

The nature of my invention consists in arranging a slate or black-board on two opposite sides of the cabinet, so that a desk or table may be used on one side of the cabinet, and a black-board on the other, at the same time; and in combining, permanently, with a desk-lid, or board, or table, slated or black-board surface, on the under side, for its appropriate and proper use.

In the following description of my invention, I shall refer to the drawings hereinbefore mentioned, of which—

Figure 1 is a plan of my cabinet;

Figure 2, a sectional elevation; and

Figure 3, a front elevation.

The case A has four vertical sides, and may be constructed with such dimensions and proportions as may be deemed most advantageous. It consists of three principal divisions, the middle division, C, having one above, and another below it.

The upper division, which I call the library, is divided horizontally by the shelf *a*, and also vertically by the partition $a^1$, so as to form several compartments, as $a^2$. It is also provided with doors, *b* and *b'*, on opposite sides of the case.

The middle division, C, is open on one side, but closed on the opposite side, being intended, chiefly, for the reception of maps and charts, which may be hung across the open side, or within, or back against the closed side opposite, as may be preferred.

The other two sides of the division C are provided with leaves or doors, *d* and *d'*, attached to the case or cabinet, at their lower edges, by hinges, and having, on one or both sides, a slate, slated or black-board surface.

When let down, these leaves or doors form a desk on two opposite sides of the cabinet, their outer edges being supported by the arms or standards E' E', pivoted to the ends of the sliding bars E E.

When not in use, the arms E' may be turned down upon the bars E, and both together pushed in under the case.

At the bottom of the division C, drawers *f* and *f'* are arranged, for pens, pencils, &c.; and below these, in the upper part of the lower division, the drawers *g* and *g'* are placed, for stationery and other articles, so that each desk is provided with two drawers, one above, and the other below, as shown.

The lower division of the cabinet, intended to be a receptacle for gymnastic apparatus and other articles, is provided with shelves, $h^1$ and $h^2$, and with doors, *i i*, opening right and left.

The foregoing being a description of my desk or table and college-cabinet, combined, 1. I claim arranging a slate or black-board on two opposite sides of the cabinet, so that a desk may be used on one side, and a black-board on the other, at the same time, substantially as described.

2. I claim combining, permanently, with a table, or desk-lid, or board, slated or black-board surface, on the under side, for its appropriate and proper use, substantially as described.

WILLIAM W. LEVERING.

Witnesses:

WM. DENNIS,

EDM. F. BROWN.